Patented Dec. 7, 1937

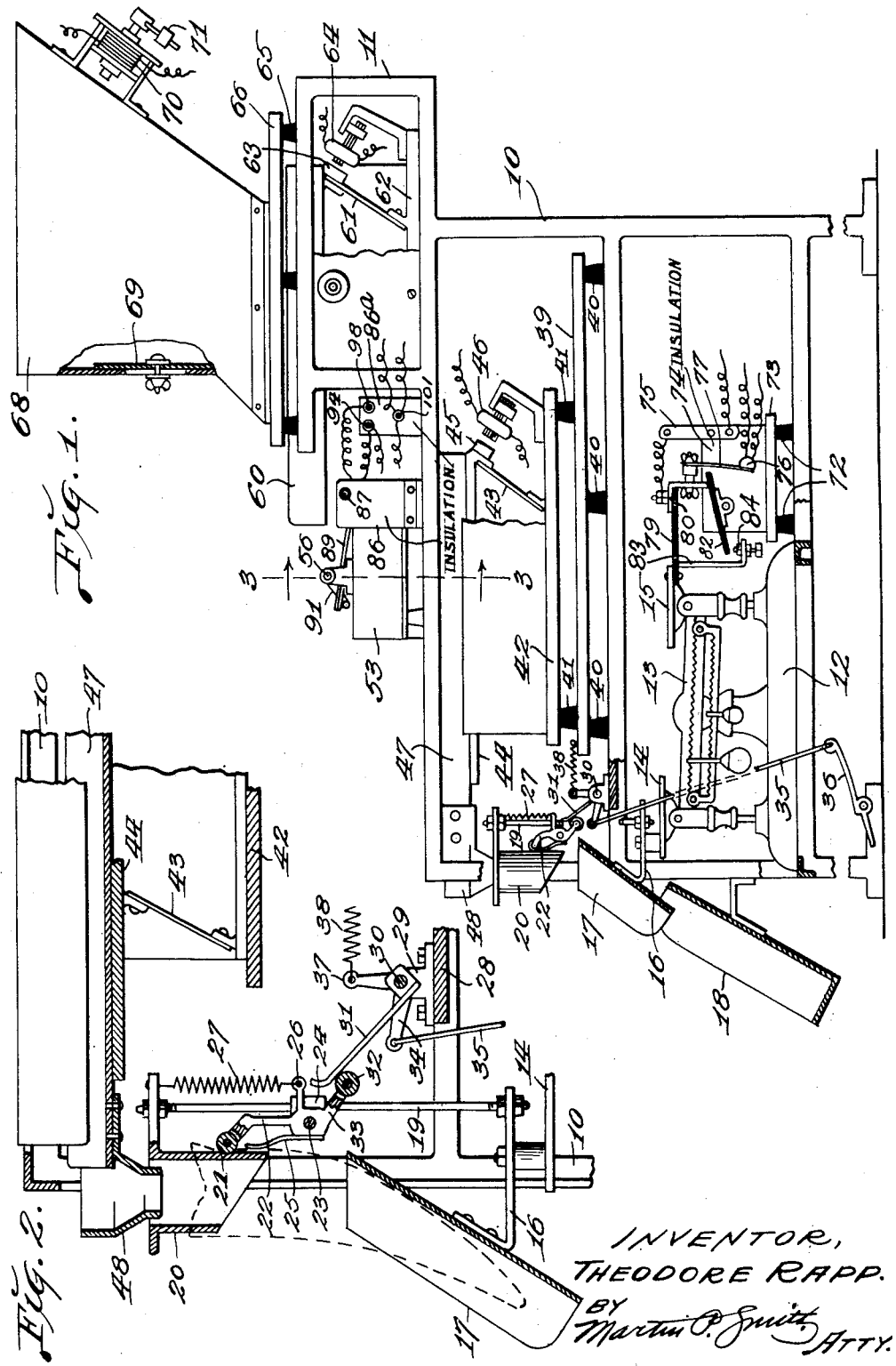

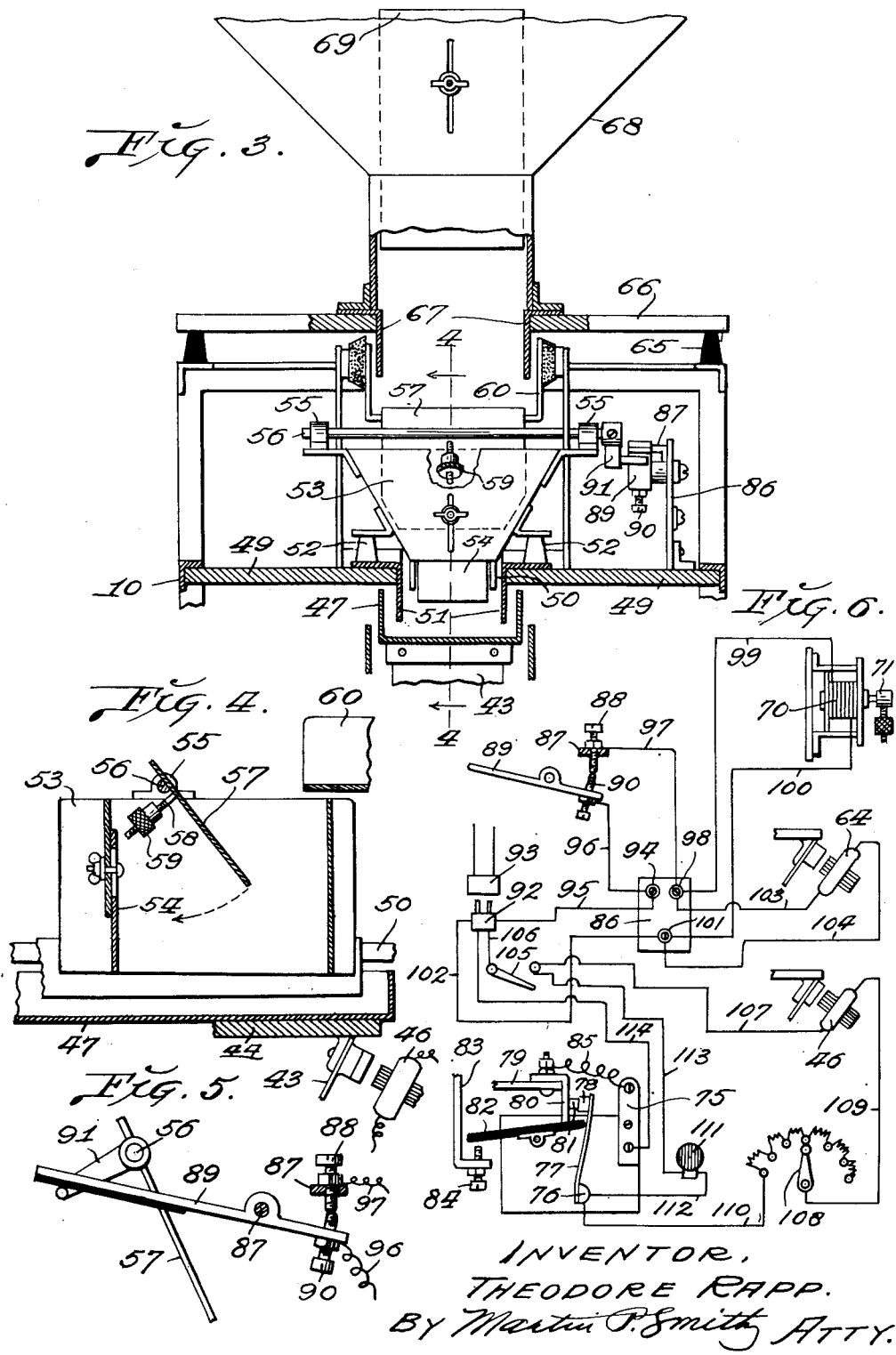

2,101,561

UNITED STATES PATENT OFFICE 2,101,561

AUTOMATIC WEIGHING AND PACKAGING MACHINE

Theodore Rapp, Los Angeles, Calif.

Application November 22, 1935, Serial No. 51,000

15 Claims. (Cl. 249—2)

My invention relates to a combined weighing and packaging machine especially designed for the automatic and comparatively rapid and accurate weighing and packaging of predetermined amounts of various products and the machine herein set forth is an improvement on a similar weighing and packaging machine that forms the subject matter of an application for U. S. Letters Patent filed by me April 17, 1935, Serial No. 16,759.

The principal objects of my present invention are, to generally improve upon and simplify the construction of the weighing and packaging machine disclosed in my aforesaid copending patent application as well as other existing forms of similar weighing and packaging machines and further, to provide a relatively simple, practical and inexpensive machine that may be conveniently and economically employed for the weighing of predetermined amounts of relatively soft pulverized products and delivering the accurately weighed amounts of product into bags or other containers which, after being closed and sealed, are ready for delivery to purchasers.

Certain pulverized products, for instance chili powder, powdered or pulverized material used as an insecticide and certain pulverized or powdered products which contain a small moisture or oleaginous content, and other non free flowing pulverized products or material, tend to pack and clog while passing through weighing and packaging machines, with the result that there is an irregular feed of the material through the machine and into the bags or receptacles and it is one of the principal objects of my invention to provide simple and efficient means controlled by the action of the material in passing from one trough or hopper to the other, to automatically regulate the feed of material and cause the same to flow or feed in a practically continuous and uniform stream from the main hopper or source of supply to the bags or receptacles that receive the predetermined amounts of the product or material.

A further object of my invention is, to provide an automatic weighing and packaging machine of the character referred to that includes electric circuits and electrically operated means for imparting vibratory movement to troughs through which the product or material travel as a result of the vibratory movement imparted to the troughs and said circuits also including automatic switches controlled by the movement of the tilting scale beam for opening and closing the trough vibrating means and also for controlling the flow or passage of the product or material from the main supply hopper to and through the vibrating troughs.

A further object of my invention is, to provide in a machine of the character referred to, means for imparting vibratory movement to the main supply hopper of the machine in order to cause the product or material to discharge freely therethrough and which hopper vibrating means is controlled by a switch in the electric circuit and the latter being automatically actuated by the movement or flow of material from one vibrating trough to a hopper and from the latter to another vibrating trough.

With the foregoing and other objects in view my invention consists in certain novel features of construction and arrangements of parts that will be hereinafter more fully described and claimed and illustrated in the accompanying drawings in which:

Fig. 1 is a side elevational view of an automatic weighing and packaging machine constructed in accordance with my invention and with parts thereof in vertical section.

Fig. 2 is a vertical section taken through the center of the forward portion of the lower one of the vibrating troughs and through the parts that receive and hold the bag or other receptacle that is being filled with a predetermined amount of the pulverized product.

Fig. 3 is an enlarged cross section taken on the line 3—3 of Fig. 1.

Fig. 4 is a vertical longitudinal section taken on the line 4—4 of Fig. 3.

Fig. 5 is a detail view of an automatic switch located in the electric circuit and which acts automatically to open the circuit to the main supply hopper vibrating means and to the vibrating means for the upper one of the vibrating troughs.

Fig. 6 is a diagrammatic view of the electrical circuits utilized in my improved weighing and packaging machine.

Referring by numerals to the accompanying drawings which illustrate a preferred embodiment of my invention, 10 designates a substantially rectangular frame preferably composed of metal rails and surmounting the rear portion of this frame, is a small frame 11 that projects a short distance rearwardly from the main frame.

Suitably supported in the lower front portion of frame 10 is a conventional weighing scale 12 having a tilting beam 13 and mounted on the ends of said beam is a front platform 14 and a rear platform 15.

Suitably supported on front platform 14, is a bracket 16 and carried thereby in front of the frame, is an inclined chute 17 that provides a support for the bags or containers that receive the weighed product.

Suitably supported on the front of frame 10, below the chute 17, is a receptacle 18 that receives the filled bags or containers after the same have been filled and pass through chute 17.

Secured to bracket 16, are the lower ends of vertically disposed rods 19 and adjustably carried by the upper ends of said rods, is a short vertically disposed spout 20 that is positioned directly above the upper end of chute 17. This spout delivers the pulverized product into the bags or containers and the open upper ends of said bags or containers are disposed around the lower portion of said spout as illustrated by dotted lines in Fig. 2.

The bags are clamped to the lower end of spout 20 by a roller 21 that is carried by the upper end of a pressure finger 22, the latter being mounted for rotation on a horizontally disposed shaft 23 and the ends of the latter being supported in brackets 24 that are mounted for vertical adjustment on the upright rods 19.

Secured to the lower portion of the pressure finger 22, is an upwardly projecting flat spring or resilient finger 25, the free upper end of which is positioned immediately beneath the roller 21 and said finger functions as a resilient guide when the rear portion of the open upper end of the bag or container is applied to the lower end of spout 20.

Projecting inwardly from pressure finger 22, just above the shaft 23, is an arm 26, to which is connected the lower end of a retractile spring 27 and the upper end of this spring is connected to the upper portion of spout 20. This spring tends to swing the pressure finger 22 on shaft 23 so as to cause roller 21 to engage the rear portion of the bag and press the same against the spout 20, thereby firmly holding the bag on the spout during the filling operation.

Suitably supported within frame 10 to the rear of chute 17, is a platform 28 and mounted on the forward portion thereof are brackets 29 that support a transversely disposed shaft 30.

Secured to this shaft, is the lower end of an upwardly and forwardly projecting finger 31 and the free upper end of this finger bears on top of a roller 32 that is journaled in the lower or rear end of an arm 33 that projects from the lower end of pressure finger 22.

Projecting forwardly from shaft 30, is a short crank arm 34 and pivotally connected to the forward end thereof, is the upper end of a pull rod 35 that extends downwardly through the frame 10 and the lower end of said rod being pivotally connected to a pedal 36 that is pivotally mounted in the lower front portion of frame 10.

When pedal 36 is depressed, rod 35 will be drawn downward so as to rotate shaft 30 and as a result the forward upper end of finger 31 will press downwardly on roller 32 to swing pressure finger 22 on shaft 23 and move roller 21 rearwardly away from spout 20 against the resistance offered by spring 27, thereby permitting the filled bag to drop by gravity through chute 17 into receptacle 18.

Projecting upwardly from shaft 30, is a short crank arm 37, to which is connected the forward end of a retractile spring 38 and the rear end thereof being connected to the forward portion of a platform 39. This platform is supported by rubber feet 40 and the latter being mounted on the platform 28.

Supported by rubber feet 41 above platform 39, is a plate 42 and projecting upwardly and rearwardly therefrom, is a series of thin metal plates such as 43 and supported by the upper ends of the latter, is a plate 44. The rear end of this plate 44 carries an armature 45 and positioned adjacent the latter, is an electromagnet 46 which when energized, draws armature 45 rearwardly and then as the circuit through the magnet is broken the armature is released and such action imparts rapid vibratory movement to plate 44.

Carried on top of plate 44, is a horizontally disposed material feeding trough 47, the forward end of which terminates above and slightly inwardly from spout 20.

Secured to the forward open end of trough 47 is a small depending hopper or spout 48, the lower portion of which projects into the open upper end of spout 20, there being clearance between that portion of the hopper 48 that projects into said spout 20.

Positioned in the upper portion of frame 10 above the trough 47, is a platform 49 and formed therein above the rear portion of said trough, is a longitudinally disposed opening 50. Depending from the sides of this opening are aprons 51 that project downwardly into trough 47.

Supported by rubber feet 52 above the rear portion of trough 47, is a hopper 53 having inclined side walls that converge downwardly and mounted for vertical adjustment on the front wall of this hopper, is a vertically disposed plate 54 that functions as a gate to control the passage of products from the hopper into the vibrating trough 47.

Mounted to rotate freely in bearings 55 on top of hopper 53 adjacent the front wall thereof, is a shaft 56 and secured thereto, is a plate 57 that extends downwardly into the hopper.

Secured to the upper portion of this plate below shaft 56, is a downwardly and rearwardly projecting arm 58 that is threaded for the reception of a weighted nut 59. This nut serves as a counterbalance for the weight of the lower portion of plate 57 and tends to swing the lower portion of said plate forwardly and upwardly through the hopper.

Supported within the upper portion of superstructure 11, is a horizontally disposed vibrating trough 60, the forward open end of which is positioned above the rear portion of hopper 53. This trough is supported by thin metal plates 61, the lower ends of which are secured to plate 62 that is positioned on the rear portion of platform 49. The rear one of the plates 61 carries an armature 63 that is attracted by an electromagnet 64 so that as said magnet is energized said trough 60 will be vibrated longitudinally to feed material into hopper 53.

Supported by rubber feet 65 above superstructure 11, is a platform 66, in which is formed an opening and projecting downwardly from the sides of this opening into trough 60, are aprons 67.

Supported on platform 66, is a main supply hopper 68 and mounted for vertical adjustment on the front wall of said hopper, is a plate 69 that functions as a gate to control the flow or passage of the product from the hopper into vibrating trough 60.

Mounted on the upper portion of the rear wall of hopper 68, is a motor 70 and carried by the outer end of the shaft of the motor, is a weighted arm 71. This weighted arm which projects radially from the motor shaft is effective in producing vibratory movement while the motor is in operation and this vibratory movement is imparted to the hopper 68 and in turn the product within said hopper is slightly vibrated, thereby tending to cause the same to feed evenly downwardly into trough 60.

Supported by rubber feet 72 in the frame 10 to the rear of the scale 12, is a small platform 73 and secured thereto is an upwardly projecting panel 74 of insulation.

Secured to the rear end of panel 74, is an upwardly projecting metal plate 75. Seated in the lower portion of panel 74, is a metal stud 76 and projecting upwardly therefrom, is a thin strip 77 of resilient metal that functions as a spring and carried by the upper end of said metal strip, is a contact 78.

Secured to the rear scale platform 15, is an outwardly projecting arm 79, the outer portion of which is bent downward to form a depending finger 80 and carried by said finger is a contact 81 that is adapted to be engaged by contact 78.

Pivotally mounted on the side of panel 74, is a lever 82 of insulation and one end of this lever extends beneath finger 80 and said end is adapted to engage the upper portion of the resilient strip 77 to move same outwardly and thereby move contact 78 away from contact 81.

The tendency of the resilient strip 77 is to maintain contact 78 in engagement with contact 81.

Depending from arm 79 is an arm 83 having its lower end bent at right angles so as to extend beneath the outer end of lever 82 and adjustably seated in the laterally bent end of this arm 83 is a screw 84 which when arm 83 is elevated, engages the corresponding end of lever 82 and swings the latter upon its fulcrum.

A flexible conductor 85 connects the upper end of the metal strip 75 with the depending finger 80 that carries contact 81.

Mounted on platform 49 to the side of hopper 53, is a vertically disposed panel 86 of insulation and secured to the upper portion thereof, is an inwardly projecting bracket 87, in which is seated an adjustable contact point 88.

Pivotally mounted on the inner face of panel 86, is an arm 89 and adjustably seated in the forward end of this arm is a contact point 90 that is adapted to engage contact point 88.

Mounted on the adjacent end of shaft 56, is a short crank arm 91 and the free end thereof engages beneath the arm 89 on the opposite side of its axis from the contact point 90 (see Fig. 5).

The electrical circuits for the machine are illustrated in Fig. 6 and said circuits include a plug 92 that is adapted to be inserted in a main line socket 93.

Leading from plug 92 to a fixed contact 94 on a panel 86a that is positioned on platform 49 to the rear of panel 86, is a conductor 95 and leading from said contact 94 to contact 90 carried by the forward end of arm 89, is a conductor 96. A conductor 97 leads from bracket 87 that carries contact 88 to a fixed contact 98 on panel 86 and leading from this contact to the motor 70, is a conductor 99.

A conductor 100 leads from motor 70 to a fixed contact 101 on panel 86 and leading from this fixed contact to plug 92, is a conductor 102.

A conductor 103 leads from fixed contact 98 to magnet 64 and leading from said magnet to contact 101, is a conductor 104.

Leading from plug 92 to a manually operable switch 105 that is conveniently located on the front portion of the machine, is a conductor 106 and leading from said switch to the electromagnet 46 is a conductor 107.

Leading from magnet 46 to the swinging arm of a rheostat 108, is a conductor 109 and leading from one end of this rheostat to stud 76, is a conductor 110.

Leading from stud 76 to a small red lamp 111 that is located at a convenient point on the front of the machine, is a conductor 112 and leading from said lamp to switch 105, is a conductor 113.

Leading from plug 92 to plate 75 to which conductor 85 is connected, is a conductor 114.

In the operation of my improved machine, the product to be weighed and packaged is delivered into hopper 68 and passes by gravity therefrom downwardly into vibrating trough 60.

To set the machine for operation, plug 92 is inserted in socket 93 and switch 105 is closed.

Counter balancing weight 59 holds plate 57 in the inclined position as illustrated in Figs. 4 and 5 and the crank arm 91 in its lowermost position permits pivoted arm 89 to occupy a position so that contacts 88 and 90 are closed.

The scale 12 is adjusted so that its beam will tilt only when a predetermined weight is applied to the front platform 14 and thus the rear platform 15 is positioned so that screw 84 is out of engagement with the rear end of lever 82 and the forward end thereof being elevated, is out of engagement with the resilient arm 77 so that contact 78 is in engagement with contact 81.

When switch 105 is closed at the start of the weighing operations, lamp 111 will be lighted by current that flows from plug 92 through conductor 106, switch 105, conductor 113 and from the lamp through conductor 112 to stud 76, spring arm 77, closed contacts 81 and 78, bracket 80, conductor 85, plate 75 and through conductor 114 back to plug 92.

Simultaneously electromagnet 46 will be energized to impart vibratory movement to trough 47 by current that passes from switch 105 through conductor 107 and from the electromagnet through the conductor 109 to and through rheostat 108, thence through conductor 110 to stud 76 and from thence through arm 77, contacts 78 and 81, bracket 80, conductor 85, arm 75 and conductor 114 to plug 92.

By adjusting the swinging arm of rheostat 108, the speed of vibration imparted to trough 47 may be very accurately controlled and consequently controlling the passage of product through said trough and into the bags or receptacles.

When plug 92 is inserted in socket 93, motor 70 will be supplied with current which passes through conductors 95 and 96, contacts 90 and 88 and conductors 97 and 99 and from the motor the current passes through conductors 100 and 102 to plug 92.

Simultaneously current flows from contact 98 to which conductors 97 and 99 are connected through conductor 103 to electromagnet 64 to impart vibratory movement to trough 60 and from said electromagnet the current passes through conductors 104 and 102 to plug 92.

The operator sitting in front of the machine, opens the mouth of a bag or receptacle and moves the latter upward so that the open end of the bag surrounds the lower portion of spout 20. Prior to this action, the pedal 36 is slightly depressed to swing finger 22 on its axis and move roller 21 away from the spout and after the open end of the bag has been positioned around the spout, the pressure on the pedal is relieved to permit the pressure finger 22 to return to its normal position so that roller 21 clamps the bag against the spout and thereby holding said bag in position to receive its filling of product.

The motor 70 having an unevenly balanced shaft, will, during operation, develop vibration that is imparted to hopper 68, thus vibrating the contents of said hopper to such a degree as to overcome any tendency of the pulverized material to pack and not feed freely through said hopper into the vibrating trough 60.

As trough 60 is vibrated by the action of electromagnet 64, the pulverizing product will be fed forwardly through said trough and will discharge through the open end thereof into hopper 53. From said hopper the product discharges into the rear portion of trough 47 that is vibrated by the action of electromagnet 46 and the product will be fed forwardly through said trough and after passing through the spouts 48 and 20, will discharge into the container suspended from spout 20 and the lower portion of which container is supported by chute 17.

When the predetermined amount of product has been delivered into the bag or container, the beam 13 of the scale 12 will tilt on its axis so that the front platform 14 is moved downward and the rear platform 15 is elevated. When screw 84 engages and lifts the rear end of lever 82 the forward end thereof in moving downward, will engage resilient arm 77 and press same outward so as to move contact 78 away from contact 81, thus opening the lamp circuit and the circuit in which the electromagnet 46 is located.

When trough 47 ceases to vibrate, the forward feed or flow of product through said trough ceases and the operator now exerts pressure of the foot upon pedal 36 to actuate pressure finger 22 to release the bag or receptacle containing a predetermined amount of the product and immediately positions the open end of a bag around spout 20 and then relieves foot pressure upon pedal 36 to permit pressure finger 22 to return to its normal position and clamp the empty bag to the spout 20.

After the bag previously filled is removed from spout 20, the scales will return to their normal position and as platform 15 moves downward, screw 84 will move away from the rear end of lever 82 to permit the latter to switch to its normal position, thereby withdrawing the forward end of said lever from the resilient arm 77 and permitting contact 78 to engage contact 81, thus closing the circuit to the electromagnet 46. With this circuit restored the electromagnet will impart vibratory movement to trough 47 and the product will be fed forwardly therethrough and discharge from the forward end thereof through spouts 48 and 20 into the bag or container.

It will be understood that the switch comprising the contacts 78 and 81 control the circuit for the electromagnet 46 that imparts vibratory movement to trough 47 and that the switch comprising the contacts 88 and 90, control the circuits in which motor 70 and electromagnet 64 are located.

Trough 47 is vibrated periodically, due to the necessity for effecting a discharge of the filled receptacle and the placing of an unfilled receptacle or spout 20.

Under normal conditions, trough 60 vibrates continuously under the action of electromagnet 64 and hopper 68 vibrates continuously under the action of motor 70 having the unbalanced shaft.

To prevent an overfeed or piling up of the product in its delivery from trough 60 to trough 47, the hopper 53 and cooperating parts are provided for the automatic control of the flow of the product from one trough to the other.

In the event that there is a piling up or an excess of product delivered into hopper 53 from trough 60, the weight of the excess of material delivered into the hopper will exert pressure upon plate 57, which swings said plate forwardly through the hopper against the resistance offered between counterbalancing weight 59 and as this action occurs, shaft 56 will be rocked so that the free end of crank arm 91 will be moved upward to impart corresponding movement to the end of the pivoted arm 88 and as the forward end of said arm is lowered, contact 90 will move away from contact 88, thereby opening the circuits to motor 70 and to electromagnet 64.

As hopper 68 and trough 60 cease to vibrate, there will be no further flow of product from the hopper to and through the trough and when the excess of product has been moved forwardly through the vibrating trough 47, plate 57 will return to its normal position so that contact 90 reengages contact 88 and the circuits in which motor 70 and electromagnet 64 are located, are reestablished.

Thus in the event of a piling up or oversupply of product occurs in hopper 53, the condition is automatically relieved and controlled by the action of the weight of the oversupply of material, which weight acts against plate 57 to open the circuits as just described.

At the end of the weighing function or when lever 82 has been tilted to engage spring arm 77 and move contact 78 away from contact 81, the circuit to lamp 111 will be opened so that said lamp ceases to burn and thus the operator will be notified that the proper predetermined amount of product has been delivered into the container so that the latter may be removed from spout 20.

While the machine as herein shown and described is particularly applicable for handling non-free-flowing pulverized or granular material, said machine in the larger sizes may be advantageously employed for the weighing and packaging of products such as crackers, cookies, macaroni elbows, marshmallows, broken or mixed candies and the like.

Thus it will be seen that I have provided a weighing and packaging machine that is relatively simple in construction, entirely automatic in operation, very effective in performing the functions for which it is intended and the machine being especially adapted for the weighing and packaging of all non-free-flowing powdered or pulverized products or materials.

It will be understood that minor changes in the size, form and construction of the various parts of my improved automatic weighing and packaging machine may be made and substituted for those herein shown and described without departing from the spirit of the invention, the scope of which is set forth in the appended claims.

I claim as my invention:

1. In a weighing and packaging machine, a hopper, means for imparting vibratory movement to said hopper, a trough into which the contents of the hopper discharge, means for imparting vibratory movement to said trough, a hopper that receives the product from the discharge end of said trough and a plate mounted for swinging movement in said last mentioned hopper, which plate is moved in one direction as a result of over-accumulation of the product discharged into said hopper from said trough.

2. In a weighing and packaging machine, a hopper, means for imparting vibratory movement to said hopper, a trough into which the contents of the hopper discharge, means for imparting vibratory movement to said trough, a hopper that receives the product from the discharge end of said trough, a plate mounted for swinging movement in said last mentioned hopper, which plate is moved in one direction as a result of over-accumulation of the product discharged into said hopper from said trough, a second trough that receives the products from the second mentioned hopper and means for imparting vibratory movement to said second mentioned trough.

3. In a weighing and packaging machine, a hopper, means for imparting vibratory movement to said hopper, a trough into which the contents of the hopper discharge, means for imparting vibratory movement to said trough, a hopper that receives the product from the discharge end of said trough, a plate mounted for swinging movement in said last mentioned hopper, which plate is moved in one direction as a result of over-accumulation of the product discharged into said hopper from said trough, a second trough that receives the product from the second mentioned hopper, means for imparting vibratory movement to said second mentioned trough, a spout arranged to receive the product from the discharge end of said second mentioned trough and means for detachably securing receptacles to said spout.

4. In a weighing and packaging machine, a hopper, a trough into which said hopper discharges, a second hopper into which said trough discharges, a plate arranged for swinging movement in said second mentioned hopper and adapted to be moved in one direction by an excess of material delivered thereinto from said trough, an electric circuit, means located in said circuit for imparting vibratory movement to said first mentioned hopper and trough, a normally closed switch in said circuit and means actuated by the swinging movement of said plate when the same is actuated by an excess of material discharged into the second mentioned hopper by said trough for opening said switch.

5. In a weighing and packaging machine, a hopper, a trough into which said hopper discharges, a second hopper into which said trough discharges, a plate arranged for swinging movement in said second mentioned hopper and adapted to be moved in one direction by an excess of material delivered thereinto from said trough, an electric circuit, means located in said circuit for imparting vibratory movement to said first mentioned hopper and trough, a normally closed switch in said circuit, means actuated by the swinging movement of said plate when the same is actuated by an excess of material discharged into the second mentioned hopper by said trough for opening said switch, a second trough into which said second mentioned hopper discharges and means for imparting vibratory movement to said second mentioned trough.

6. In a weighing and packaging machine, a hopper, a trough into which said hopper discharges, a second hopper into which said trough discharges, a plate arranged for swinging movement in said second mentioned hopper and adapted to be moved in one direction by an excess of material delivered thereinto from said trough, an electric circuit, means located in said circuit for imparting vibratory movement to said first mentioned hopper and trough, a normally closed switch in said circuit, means actuated by the swinging movement of said plate when the same is actuated by an excess of material discharged into the second mentioned hopper by said trough for opening said switch, a second trough into which said second mentioned hopper discharges, electrically operated means for imparting vibratory movement to said second mentioned trough and means for controlling the speed of vibratory movement imparted to said second mentioned trough.

7. In a weighing and packaging machine, the combination with a weighing scale having a tilting beam, of means carried by one end of said beam for supporting receptacles, a trough arranged to discharge its contents into the receptacle carried by said supporting means, electrically operated means for imparting vibratory movement to said trough, a hopper arranged to discharge material into said trough, an electrically actuated trough adapted to discharge material into said hopper, means actuated by an excess of material delivered by said second mentioned trough into said hopper for controlling the operation of said second mentioned trough and means actuated by the tilting movement of the scale beam when a predetermined amount of product has been delivered into the receptacle supported by one end of said beam for controlling the operation of the electrically operated vibrating means for the first mentioned trough.

8. In a weighing and packaging machine, the combination with a weighing scale having a tilting beam, of means carried by one end of said beam for supporting receptacles, a trough arranged to discharge its contents into the receptacle carried by said supporting means, electrically operated means for imparting vibratory movement to said trough, a hopper arranged to discharge material into said trough, an electrically actuated trough adapted to discharge material into said hopper, means actuated by an excess of material delivered by said second mentioned trough into said hopper for controlling the operation of said second mentioned trough, means actuated by the tilting movement of the scale beam when a predetermined amount of product has been delivered into the receptacle supported by one end of said beam for controlling the operation of the electrically operated vebrating means for the first mentioned trough and means for controlling the speed of said trough vibrating means.

9. In a weighing and packaging machine, a hopper, a trough arranged to discharge material into said hopper, a second hopper arranged to discharge material into said trough, electrically operated means for imparting vibratory movement to said trough, means for imparting vibratory movement to the second mentioned hopper and means actuated by the volume of material delivered into said first mentioned hopper for controlling the operation of said trough vibrating means and said hopper vibrating means.

10. In a weighing and packaging machine, a hopper, a trough arranged to discharge material into said hopper, a second hopper arranged to discharge material into said trough, electrically operated means for imparting vibratory movement to said trough, means controlled by the amount of material delivered into said first mentioned hopper for controlling the operation of said trough vibrating means, a second trough into which said first mentioned hopper discharges and electrically operated means for imparting vibratory movement to said second mentioned trough.

11. In a weighing and packaging machine, a hopper, a trough arranged to discharge material into said hopper, a second hopper arranged to discharge material into said trough, electrically operated means for imparting vibratory movement to said trough, means controlled by the amount of material delivered into said first mentioned hopper for controlling the operation of said trough vibrating means, a second trough into which said first mentioned hopper discharges, electrically operated means for imparting vibratory movement to said second mentioned trough and means carried by the discharge end of said second mentioned trough for engaging and supporting containers.

12. In a weighing and packaging machine, a hopper, a trough arranged to discharge material into said hopper, a second hopper arranged to discharge material into said trough, electrically operated means for imparting vibratory movement to said trough, means controlled by the amount of material delivered into said first mentioned hopper for controlling the operation of said trough vibrating means, a second trough into which said first mentioned hopper discharges, electrically operated means for imparting vibratory movement to said second mentioned trough, means carried by the discharge end of said second mentioned trough for engaging and supporting containers and means actuated by the weight of material delivered into the containers supported beneath the discharge end of said second mentioned trough for controlling the operation of said trough vibrating means.

13. In a weighing and packaging machine, a hopper, a trough arranged to discharge material into said hopper, a second hopper arranged to discharge material into said trough, electrically operated means for imparting vibratory movement to said trough, means controlled by the amount of material delivered into said first mentioned hopper for controlling the operation of said trough vibrating means, a second trough into which said first mentioned hopper discharges, electrically operated means for imparting vibratory movement to said second mentioned trough, means carried by the discharge end of said second mentioned trough for engaging and supporting containers, means actuated by the weight of material delivered into the containers supported beneath the discharge end of said second mentioned trough for controlling the operation of said trough vibrating means and means for controlling the speed of vibratory movement imparted to said second mentioned trough.

14. In a weighing and packaging machine, a hopper, means for imparting vibratory movement to said hopper, a trough into which the contents of the hopper discharge, means for imparting vibratory movement to said trough, a hopper into which said trough discharges, and means located within said last mentioned hopper and automatically actuated by an abnormal amount of material discharged into said last mentioned hopper by said trough, for controlling the operation of the hopper vibrating means.

15. In a weighing and packaging machine, a hopper, means for delivering material to be weighed into said hopper, electrically operated means for imparting vibratory movement to said material feeding means, and automatically operated means having parts located within said hopper and actuated by an overflow of material through said hopper for controlling the operation of said electrically operated vibrating means.

THEODORE RAPP.